United States Patent [19]

Fujino

[11] Patent Number: 4,581,444

[45] Date of Patent: Apr. 8, 1986

[54] FLOCCULATION OF LATEX PARTICLES AND PRODUCTION OF THERMOPLASTIC RESIN

[75] Inventor: Kiyoharu Fujino, Yokkaichi, Japan

[73] Assignee: Mitsubishi Monsanto Chemical Company, Tokyo, Japan

[21] Appl. No.: 723,186

[22] Filed: Apr. 15, 1985

Related U.S. Application Data

[62] Division of Ser. No. 457,246, Jan. 11, 1983.

[30] Foreign Application Priority Data

Jan. 26, 1982 [JP] Japan ................................. 57-10687
May 7, 1982 [JP] Japan ................................. 57-76296
Jul. 30, 1982 [JP] Japan ................................. 57-133327

[51] Int. Cl.$^4$ .............................................. C08F 6/14
[52] U.S. Cl. ................................... 528/487; 528/486;
528/488; 528/491; 528/492; 528/494; 528/495;
528/498; 528/502; 524/563; 524/565; 524/567;
524/569; 524/575; 524/577

[58] Field of Search ............... 528/486, 487, 488, 491,
528/492, 494, 495, 502, 498

[56] References Cited

U.S. PATENT DOCUMENTS

4,303,569 12/1981 Güurak ................................. 528/488
4,491,658 1/1985 Sugimori ............................. 528/486

Primary Examiner—Christopher A. Henderson
Attorney, Agent, or Firm—Oblon, Fisher, Spivak, McClelland & Maier

[57] ABSTRACT

A method for flocculating latex particles in a latex is characterized in that a water soluble cationic polymer containing a quaternary ammonium salt in its molecular chain is added as a flocculant to the latex. Also disclosed is a process for producing a thermoplastic resin which comprises flocculating latex particles in a latex material by adding a water soluble cationic polymer containing a quaternary ammonium salt in its molecular chain to the latex, removing freed water from the flocculated latex to obtain a wet cake and then drying the wet cake directly or after the granulation.

7 Claims, No Drawings

FLOCCULATION OF LATEX PARTICLES AND PRODUCTION OF THERMOPLASTIC RESIN

This is a division, of application Ser. No. 457,246, filed Jan. 11, 1983.

BACKGROUND OF THE INVENTION

Field of the Background

The present invention relates to a method for flocculating latex particles in a latex, aqueous emulsion or microsuspension (hereinafter referred to simply as "latex") prepared by emulsion polymerization or microsuspension polymerization. The present invention also relates to a process for producing a thermoplastic resin.

Heretofore, a method of flocculating a latex followed by water removal has been industrially employed as a classical technique for obtaining solid rubber from a natural rubber latex and more recently in a process for producing ABS rubber. A flocculation technique used to be applied also to a vinyl chloride resin latex (i.e., a PVC emulsion).

Various methods have been known to destabilize an emulsion system of a latex, such as a method of adding a strong acid to the emulsion system, a method of adding a polyvalent metal salt to the system, a method of adding an organic flocculant such as methyl cellulose, carboxymethyl cellulose, polyacrylic acid, polyacryl amide, polyimide, polyamine or ammonium alginate to the system or a method of heating the emulsion system.

However, each of these methods has had its own demerits one way or another. There have been no method which is fully satisfactory for the flocculation of latex particles. For instance, when a salt is added to a vinyl chloride resin latex having a solid content of from 40 to 50%, the latex will solidify to form a bean curd-like or semi-solid mass, whereby the flowability will be completely lost and the subsequent treatment will be practically impossible. If the letex is diluted with water to have a solid content of from 15 to 20%, the flowability can be maintained even when the latex is solidified. However, there is no practical industrial method to remove water from the solidified product or a great amount heat energy used to be required to evaporate the water therefrom. Further, the solid aggregates obtained by such a drying step, are very hard and even when they are pulverized into fine powder, they can hardly be dispersed in a plasticizer and thus they can not practically be used as a plastisol. When the latex solidifies into a bean curd-like or semi-solid mass, the latex particles coagulate to form aggregates containing or occluding substantial amounts of water and the entire system forms a single solidified mass, whereby the flowability is completely lost. The solidified mass establishes a strong structure while occluding water therein, whereby centrifugal separation becomes practically impossible and the removal of water under reduced pressure likewise becomes impossible.

Under the circumstances, for the preparation of a thermoplastic resin such as a paste resin to be used for the preparation of a plastisol or an organosol (hereinafter referred to simply as "plastisol"), it has been common to employ a method in which a latex having an average particle size of at most about 3 $\mu$m is prepared by emulsion polymerization or microsuspension polymerization and then the latex thereby obtained is subjected to spray drying. However, in order to use this method effectively, it is necessary to bring the solid content in the latex as high as possible. Otherwise, the cost for drying will be quite high. On the other hand, for a latex to be stable, it is necessary to maintain the solid content at a level of at most 45%. Otherwise, a great amount of aggregates are likely to form at the time of the polymerization, or a great amount of an additive such as an emulsifier is required, whereby a quality problem is likely to be led.

On the other hand, it is conceivable to minimize the cost of energy for drying by firstly flocculating a latex and then removing water from the flocculated latex by means of filtration or centrifugal separation to increase the particle concentration. However, if the latex is simply flocculated, the flocculated product will contain a substantial amount of water as mentioned above, whereby it is practically impossible to conduct the filtration or centrifugal separation of water and the flocculated product tends to be sticky or tends to have poor flowability. The industrial operation will thereby be very difficult.

Further, a paste resin must give a plastisol when dispersed in a plasticizer. However, a paste resin obtained by the flocculation with a polyvalent metal or a conventional floccurant, does not usually give a plastisol or at best gives a plastisol having an extremely high viscosity, whereby the commercial value as a paste resin is lost. Namely, the conventional flocculation methods are based on the idea of either deactivating the emulsifier in the latex, binding the latex particles to one another with polymer chains or removing the electric charges on the surfaces of the particles. In such flocculation methods, once the particles thereby obtained are dried, they are no longer capable of being dispersed in a plasticizer.

SUMMARY OF THE INVENTION

It has now been found that if a water-soluble cationic polymer containing a quaternary ammonium salt in its molecular chain is added to the latex, it is possible to flocculate the latex particles without rendering them to adhere to one another and thereby to obtain coagulates having a size of from 20 to 50$\mu$ even when the latex has a high concentration, whereby it is possible to destabilize the emulsion system of the latex without bringing about the occlusion of water in the coagulates and even after the flocculation, the flocculated latex has the same flowability as the original latex. Further, the flocculated latex can readily be dehydrated by the decantation. When a centrifugal dehydration is employed, the flocculated latex can be concentrated to have a solid content of as high as 70% and a putty-like concentrate thereby obtained can readily be granulated and dried. The product thereby obtained readily forms a plastisol when mixed with a plasticizer.

Namely, it is a first object of the present invention to provide a flocculation method which is capable of destabilizing an emulsion system of a highly concentrated latex to flocculate latex particles whereby the flocculated latex particles occlude no substantial water and remain to be flowable and they can readily be separated by centrifugal separation.

A second object of the present invention is to provide a process for producing a granular thermoplastic resin having a great density and proper porosity from a wet cake composed of flocculated particles separated from a latex.

Thus, the present invention provides a method for flocculating latex particles in a latex, in which a water-soluble cationic polymer containing a quaternary ammonium salt in its molecular chain is added as a flocculant to the latex. For the purpose of the present invention, the term "latex" includes a latex, an aqueous emulsion and a microsuspension.

Further, the present invention provides a process for producing a thermoplastic resin which comprises flocculating latex particles in a latex by adding a water-soluble cationic polymer containing a quaternary ammonium salt in its molecular chain to the latex, removing freed water from the flocculated latex to obtain a wet cake and then drying the wet cake directly or after the granulation.

DETAILED DESCRIPTION OF THE PREFERRED EMBODIMENTS

Now, the present invention will be described in further detail.

The latex of the present invention includes a latex, an aqueous emulsion produced by the emulsion polymerization of a reactive monomer and a microsuspension produced by microsuspension polymerization. More specifically, it includes a polyvinyl chloride latex (emulsion), a polyvinyl acetate latex, a vinyl chloride-vinyl acetate copolymer latex, a polyacrylic acid ester latex, a polystyrene latex, a rubber latex, a styrene-acrylonitrile copolymer latex, an acrylonitrile-styrene-butadiene graft polymer latex, a nitrile rubber latex, a styrene-butadiene rubber latex, a butadiene rubber latex, a cis-1,4-polyisoprene rubber latex, a chloroprene rubber latex, an acrylonitrile-butadiene copolymer rubber latex, a methylmethacrylate-butadiene copolymer rubber latex, a polymethacrylic acid ester latex, an acrylic acid-methacrylic acid ester copolymer latex, an ethylene-vinyl acetate copolymer latex, a vinylidene chloride type latex, a polyethylene latex, a silicone latex, and a polybutene latex. However, the latex of the present invention is not restricted by these specific examples. The present invention is suitably applicable particularly to a polyvinyl chloride latex, a vinyl chloride-vinyl acetate copolymer latex, a polystyrene type latex, an ABS latex and a SBR latex. The particles in these latexes have a negative surface potential in the latexes. The latex particles usually have a particle size of at most $3\mu$ and the majority of them have a particle size of at most $1\mu$. The latex concentration is preferably such that the solid content of latex particles is at least 1% by weight, preferably within a range of from 15 to 50% by weight.

As the water-soluble cationic polymer containing a quaternary ammonium salt in its molecular chain, which is used as a flocculant in the method of the present invention, there may be mentioned, for instance, the compounds represented by the following general formulas (I) to (IX). At least one of these compounds is used.

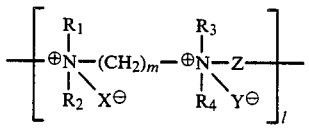

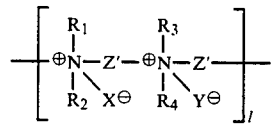

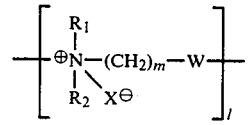

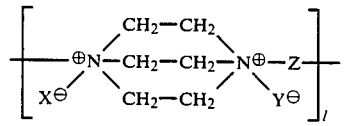

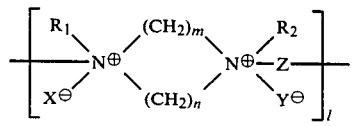

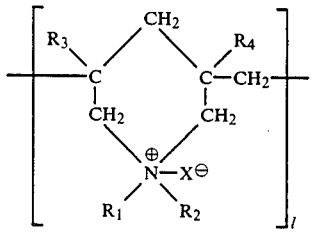

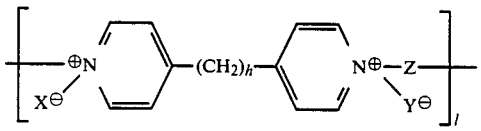

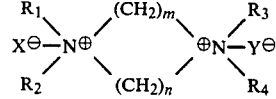

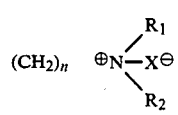

where each of $R_1$, $R_2$, $R_3$ and $R_4$ is a hydrogen atom, an alkyl group having from 1 to 6 carbon atoms or an aryl group; Z is $-(CH_2)_n-$, $-(CH_2)_h-(CF_2)_n-(CH_2)_k-$, $-(CH_2)_h-O-(CH_2)_k-$, $-(CH_2)_h-S-(CH_2)_k-$,

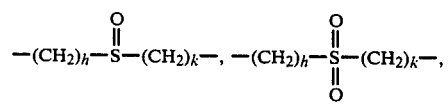

$-(CH_2)_h-S-S-(CH_2)_k-$,

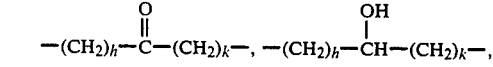

-continued

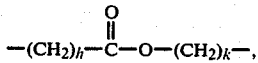

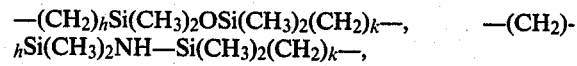

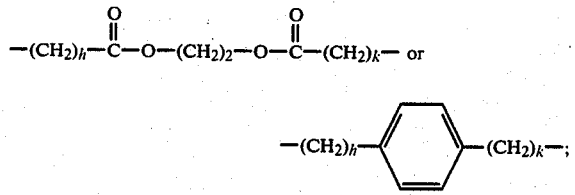

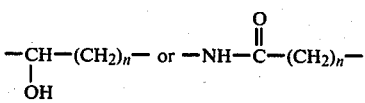

Z' is the same as Z except that Z' does not include —(CH$_2$)$_n$—; W is $$-\underset{\underset{OH}{|}}{CH}-(CH_2)_n- \text{ or } -NH-\overset{\overset{O}{\|}}{C}-(CH_2)_n-$$

provided that the methylene group —(CH$_2$)$_n$— is linked to the nitrogen atom of the quaternary ammonium salt; each of X and Y is an optional counter ion; each of m and n is an integer of from 1 to 15; each of h and k is an integer of from 1 to 6; and l is an integer of at least 2.

These compounds can be prepared by various methods. In the method of the present invention, the compounds represented by the formula [I] are preferably used. Particularly preferred are the compounds where Z is a —(CH$_2$)$_n$— group, which can represented by the general formula [I']

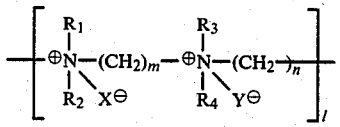

and which are called ionen polymers. The ionen polymers represented by the general formula [I'] where the alkyl group as R$_1$, R$_2$, R$_3$ or R$_4$ is a C$_{1-3}$ alkyl group such as a methyl group, an ethyl group or a propyl group, are preferred, and particularly preferred are those wherein the alkyl group is a methyl group.

Each of X and Y is an optional counter ion such as a halogen atom, particularly a chlorine atom or a bromine atom. X and Y may be the same or different. The preparation of the ionen polymers is easy when each of m and n has a small value, and a good ionen polymer can be produced when the sum of m and n has a value of at least 6. On the basis of the values of m and n, the ionen polymer is called a m,n-ionen. The value l may be an integer of at least 2. However, it is usually within a range of from 10 to 500, preferably from 10 to 200, more preferably from 10 to 150, especially from 50 to 100. The greater the value of l is, the greater the flocculation effectiveness becomes. As the values of m and n increase, the charge density in the polymer chain decreases. Accordingly, the value of m+n and the value of l should properly be selected taking into accounts the electron charge of the latex particles.

As m,n-ionens there may be used various types such as 2,4-ionen, 2,5-ionen, 2,6-ionen, 3,3-ionen, 3,4-ionen, 3,5-ionen, 3,6-ionen, 4,4-ionen, 4,5-ionen, 4,6-ionen or 4,10-ionen.

When the water-soluble cationic polymer is added to a latex, the latex particles negatively charged in the latex are electrically attracted by and gather around positive charges in the cationic polymer and the gathered latex particles repel one another to establish a flocculated state where the latex particles do not adhere to one another. The coagulates thus flocculated repel one another where the effect of the positive charges in the center does not reach the surface of the coagulates, whereby a good dispersability of the coagulates is obtainable and the entire latex establishes a good dispersion system having superior flowability and water separability without forming a bean curd-like or semi-solid mass.

The water-soluble cationic polymer may be used in a form of a solution in water or any other medium, as the case requires. It is preferred to use it as an aqueous solution containing from 0.05 to 5% by weight of the water-soluble cationic polymer.

It is preferred that the water-soluble cationic polymer is added while stirring the latex and the amount of addition is usually within the range of from 0.001 to 5% by weight, preferably from 0.01 to 1% by weight, based on the weight of the latex particles in the latex. The flocculation state of the latex particles may be controlled by the adjustment of the amount of addition. If the amount of addition is gradually increased, the viscosity of the latex gradually increases to a certain point and then starts to decrease with a further addition of the cationic polymer. From the observation of this process by an optial microscope, it has been found that in the initial stage, the latex particles flocculate under the action of the cationic polymer to form rather large coagulates. When the amount of addition is small, coagulates having a small diameter are predominant and with an increase of the amount of addition, the particle size of the coagulates increases. With a further addition of the cationic polymer, the coagulates having a large diameter tend to be divided into coagulates having a substantially uniform particle size at a level of from 10 to 100μ, especially from 20 to 50μ. By properly selecting the type of the water-soluble cationic polymer and adjusting the amount of its addition, the size of the coagulates can optionally be controlled.

According to the present invention, the cationic polymer is added to the latex and after stirring the latex, if it is left to stand still, water and the coaugulates of the latex particles will readily be separated. The water can be removed by decantation or centrifugal separation. If the centrifugal separation is employed, it is possible to remove the water to such an extent that the solid content will be high as 70% by weight and the concentrate thereby obtained can readily be dried in a usual oven. In the case where the latex is a polyvinyl chloride latex, it is possible by the application of the method of the present invention to dry the separated coagulates without necessity of using a spray drier which requires a great amount of heat energy. Besides, the dried product can readily be dispersed in a plasticizer to provide a plastisol or an organosol. The wet cake may optionally be subjected to a granulation step prior to the drying step.

Further, if the flocculated particles are heated in the form of the dispersion at a temperature higher than the glass transition point of the coagulates, the bonding strength of the flocculated particles will be increased, and the product thereby obtained can be used as a blending resin to be mixed with a paste resin.

In the present invention, when a thermoplastic resin is prepared by granulating the wet cake, it is preferred to employ a method which will be described hereinafter.

When the wet cake composed of the coagulates of the latex particles separated from the water is granulated, it is necessary to properly adjust the water content of the cake prior to the granulation, depending on the particular granulation machine to be used or the nature of the coagulates. The greater the water content is, the greater the flowability becomes. On the other hand, if the water content is small, the viscosity turns to be too high, whereby the granulation becomes difficult, or even when the granulation is possible, the granules break down to pieces during the granulating step. The granules thereby obtained tend to be disintegrated during the drying step. Further, in general, the granulated particles have a less surface area than the particles obtained by the spray drying and thus provide a smaller surface area to contact with the plasticizer. Thus, the granulated particles have a drawback that the initial absorption rate of the plasticizer is slow. Especially when the pressure at the time of the granulation is high, the coagulates tend to be packed in a higher density, whereby the absorption of the plasticizer tends to be slower. Thus, the granulated particles have an inherent physical drawback that they can not readily be converted into a plastisol.

The present inventors have conducted extensive researches to develop a granulation method which is capable of providing granulated particles having a good absorption of a plasticizer, from a wet cake composed of coagulates of the latex particles separated from the freed water. As a result, it has been found that the following two methods may advantageously be employed.

The first method comprises mixing the wet cake with a hydrophobic substance such as a hydrocarbon, a halogenated hydrocarbon, an ester compound, an ether compound, an organic phosphorous acid ester or an alcohol, followed by the granulation, whereby the granulation can readily be done with respect to wet cakes having a wide range of water content and it is thereby unnecessary to conduct a careful control of the water content. When the granulated product is dried, the dried product has a high bulk density and provides good absorption of a plasticizer. Further, if a volatile hydrophobic substance or volatile water-soluble substance is used in combination with a non-volatile hydrophobic substance, a granular thermoplastic resin having a proper porosity can readily be prepared, whereby it is possible to further improve the absorption of the plasticizer.

The second method comprises adding to the wet cake at least one agent selected from the group consisting of a non-ionic surfactant, an anionic surfactant, a cationic surfactant and an organic acid, whereby the wet cake is again suspended solely with the water contained therein and thereby regains flowability. Then, the suspension thereby obtained is spray-dried to obtain a granular thermoplastic resin having a high bulk density and proper porosity and being capable of readily adsorbing a plasticizer.

It is preferred that the wet cake to be used for the granulation has a water content of at most 50% by weight and at least 20% by weight. However, the water content may, of course, be more than 50% by weight so long as it does not bring about a difficulty for the granulation, as will be described hereinafter.

Thus, the hydrophobic substance to be used for the process of the present invention includes not only a hydrophobic substance having a small solubility in water but also a hydrophobic substance which is soluble in water and yet has a strong affinity to the surface of the coagulates of the flocculated particles. Namely, the hydrophobic substance includes a water-soluble substance which shows a stronger affinity to a resin rather than to water and thus acts as if it were a hydrophobic substance, in an aqueous system containing a resin. The hydrophobic substance is preferably in a liquid state within a temperature range of from 10° to 80° C. and preferably has a value [B] of at most 7, as calculated by the following equation:

$$[B] = \frac{[H]}{[H] + [L]} \times \frac{100}{5}$$

where [H] is the weight of hydrophilic groups in the structure of the hydrophobic substance and [L] is the weight of hydrophobic groups in the structure of the hydrophobic substance.

As such a substance, there may effectively be used, for instance, a hydrocarbon, a halogenated hydrocarbon, an ester compound, an ether compound, an organic phosphorous acid ester compound or an alcohol.

Specific examples of such a substance include hydrocarbon compounds such as $C_6$–$C_{120}$ polypropylene, $C_{10\text{-}100}$ polyisoprene, $C_{8\text{-}120}$ polybutene, $C_{6\text{-}99}$ hydrogenated polypropylene, $C_{8\text{-}100}$ hydrogenated polybutylene, terpinolene, mineral spirit, kerosine, petroleum benzine, petroleum ether, light oil, toluene, xylene, ethylbenzene, liquid paraffin, cyclohexane, isooctane, heptane and octane; halogenated hydrocarbons such as monochloroethylene, dichlorooctane, dibromoethylene, dibromopropane, dibromobutane, dibromohexane, dichlorobutane, dichloropropylene, chlorinated paraffin, brominated paraffin, trichlorobutane, octadecylfluorooctane, chlorinated polybutadiene, chloropentane, chlorohexane, dichlorooctane, and $C_{6\text{-}80}$ chlorinated polyethylene; alcohols such as propanol, isopropanol, butanol, isobutanol, hexanol, 2-ethylhexanol, laurylalcohol, parmityl alcohol, cetyl alcohol, nonyl alcohol, oleyl alcohol, myristyl alcohol, isoamyl alcohol, stearyl alcohol, octyl alcohol, cyclohexanol and nonylphenol; ether compounds such as ethylpropyl ether, dibutyl ether, butylhexyl ether, dioctyl ether, and ethyloctyl ether; and ester compounds such as methylethyl ester, ethylbutyl ester, propylamyl ester and butyloctyl ester. At least one of these compounds is used. Among them, it is preferred to use those which are volatile during the drying step. Non-volatile compounds may be used alone. However, it is preferred to use a non-volatile compound in combination with a volatile compound. When a non-volatile hydrophobic substance is used alone, it is preferred to incorporate a volatile substance having a low molecular weight such as acetone, ethylether or non-hydrophobic substance such as methanol or ethanol, whereby a thermoplastic resin composed of granulated porous particles.

The amount of addition of the hydrophobic substance is determined taking into accounts the water content and flowability of the wet cake. The amount is usually within the range of from 0.01 to 10 parts by weight, preferably from 0.1 to 5 parts by weight, per 100 parts by weight of the solid content of the wet cake. Further, it is preferred to increase the viscosity of the wet cake so that the yield stress of the wet cake becomes to be within the range of from 3,000 to 100,000 dyne/cm$^2$, preferably from 4,000 to 10,000 dyne/cm$^2$, whereby the granulation can be facilitated and the adhesion of the granules to one another can be minimized.

The wet cake thus adjusted to have a proper yield stress is then extruded and granulated into granules having a desired shape by means of a single-shaft or double-shaft screw extrusion type granulating machine or a basket type granulating machine which is provided with a screen having through-holes of a desired size. The granular product thereby obtained is then dried by means of a drier such as a multiplate drier, a fluidized drier, or a rotary kiln to remove water from the granules by evaporation. During the drying operation, water volatile components of the hydrophobic substance and volatile materials having a low boiling point will be removed from the inner and surface portions of the granules, whereby the granules become to be porous. Of course, the granulated configuration is not restricted to the above mentioned extruded configuration and it may be in a needle shape, a granular shape, or a spherical shape.

The flowability-promoting agent to be used in the process of the present invention is usually a surfactant such as a non-ionic surfactant, an anionic surfactant, or a cationic surfactant, or an organic acid or organic base. The efficiency of the flowability-promoting agent can be determined by adding the flowability-promoting agent to the wet cake in an amount of 0.2 part by weight per 100 parts by weight of the solid content of the wet cake and stirring or leaving the wet cake to stand still for from 5 to 10 minutes to see if the wet cake becomes flowable. It is thereby possible to readily determine whether or not the particular flowability-promoting agent is suitable or not. Further, the selection of a suitable flowability-promoting agent can be easily made on the basis of the experience. The most suitable flowability-promoting agent is a non-ionic surfactant, an anionic surfactant or a cationic surfactant which has polyoxyethylene in its molecular chain.

As such a non-ionic surfactant, there may be mentioned, for instance, polyoxyethylene nonylphenyl ether, polyoxyethylene octylphenylether, polyoxyethylene biphenyl ether, polyoxyethylene secondary-alkyl ether, polyoxyethylene cetyl ether, polyoxyethylene spermcetyl ether, polyoxyethylene lauryl ether, polyoxyethylene myristyl ether, polyoxyethylene oleyl ether, polyoxyethylene dilaurate, polyoxyethylene oleate, polyoxyethylene castor oil ester or polyoxyethylene sorbitane monooleate. As the anionic surfactant, there may be mentioned, for instance, polyoxyethylene laurylsulfate, sodium polyoxyethylene nonylphenylether sulfate

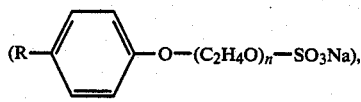

triethanolamine polyoxyethylene lauryl alcohol ether sulfate, ammonium polyoxyethylene lauryl alcohol ether sulfate, sodium polyoxyethylene lauryl alcohol ether sulfate ($C_{12}H_{25}$—$O(C_2H_4O)_n$—$SO_3Na$), sodium polyoxyethylene lauryl ether sulphonate, a mixture of polyoxyethyl laurylphosphates

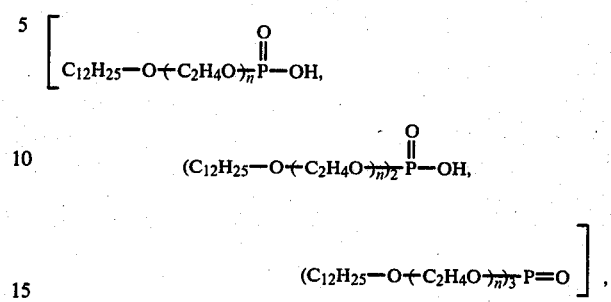

a mixture of polyoxyethylene nonylphenyl ether phosphates

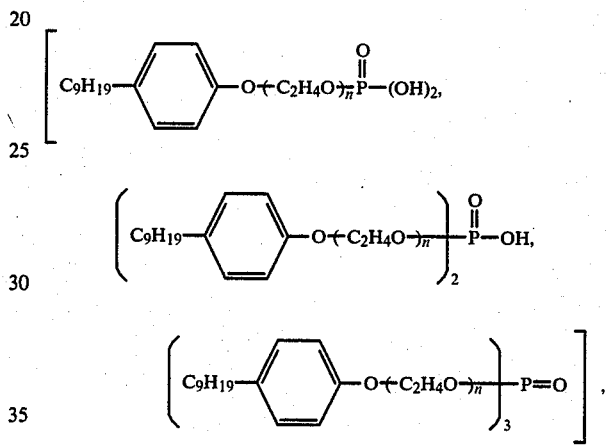

polyoxyethylene glycerol borate laurate

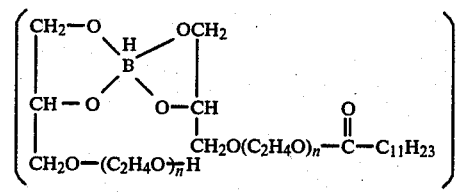

sodium polyoxyethylene nonylphenyl ether sulfosuccinate

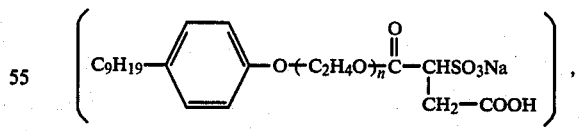

sodium polyoxyethylene lauryl ether sulfate [$C_{12}H_{25}$—$O(C_2H_4O)_n$—$SO_3Na$], or triethanolamine polyoxyethylene lauryl ether sulfate [$C_{12}H_{25}O$—$(C_2H_4O)_n$—$SO_3NH(CH_2CH_2OH)_3$]. As the cationic surfactant, there may be mentioned, for instance, polyoxyethylene octylamines [$C_8H_{17}NH$—$(C_2H_4O)_n$—$H$, $C_8H_{17}N$—$(C_2H_4O)_n$—$H)_2$], polyoxyethylene laurylamino ether, polyoxyethylene oleylamino ether, polyoxyethylene laurate mono-ethenolamide or cetylethyldimethylammonium bromide

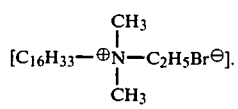

As the organic acid, there may be mentioned, for instance, acetic acid, capric acid, citric acid, oxalic acid, malonic acid or maleic acid. When used as the flowability-promoting agent, these compounds serve to loosen the coagulates of latex particles flocculated by the water-soluble cationic polymer and to render the latex particles flowable solely with the water contained in the wet cake i.e. without addition of any additional water.

The flowability-promoting agent is added to the wet cake in an amount of from 0.05 to 5 parts by weight, preferably from 0.1 to 2 parts by weight, per 100 parts by weight of the solid content in the wet cake, whereby a suspension having a flowability with an apparent viscosity of at most 20,000 cp, mostly at most 10,000 cp, within a range of the apparent shear rate of from 1 to 5 $sec^{-1}$ as measured by a B-type rotar viscosimeter, can be obtained without any addition of water. The flowability-imparted wet cake is then subjected to spray granulation drying by means of e.g. a rotary disc spray drier, a single nozzle spray drier or a double nozzle spray drier. The spray drying can be controlled to provide an average particle size of from 10 to 500 μm by adjusting the viscosity of the suspension, the rotational speed of the rotary disc or a feeding speed of the suspension. It is particularly preferred to control the spray drying to provide an average particle size of from 50 to 200 μm. The spray-dried product should preferably have a bulk density of from 0.4 to 0.62 $g/cm^3$, especially at least 0.50 $g/cm^3$, so as to minimize the formation of a dust whereby the working environment can be improved and to provide a proper porosity so that the absorption of a plasticizer can be faciliated.

According to the process of the present invention, the granulation can easily be done without necessity to carefully control the amount of the water in the wet cake, i.e., simply by adding a hydrophobic substance to increase the viscosity of the wet cake, followed by extrution or by adding a flowability-promoting agent to increase the flowability, followed by spray drying. The granular particles thereby obtained do not adhere to one another and do not undergo disintegration at the time of the drying. The granular thermoplastic resin thus obtained has a great bulk density and is suitable for bulk transportation or automatic weighing. Further, in a case where a volatile phydrophobic substance or a volatile substance having a low molecular weight is incorporated in the wet cake, the dried granules will be porous and will readily absorb the plasticizer. For instance, in a case where the thermoplastic resin is a polyvinyl chloride resin, it readily absorbs a plasticizer to form a plastisol.

Now, the present invention will be described in detail with reference to Examples. However, it should be understood that the present invention is by no means restricted by these examples. In the examples, "parts" means "parts by weight". Further, the water content of the wet cake is expressed by the percentage of the weight reduction of the wet cake when it was kept at a temperature of 70° C. for 24 hours.

EXAMPLE 1

To 10 kg of a vinyl chloride paste resin latex having a solid content of 45%, 8 of a N,N-dimethylalkylene quaternary ammonium bromide polymer i.e. 3,4-ionen represented by the general formula

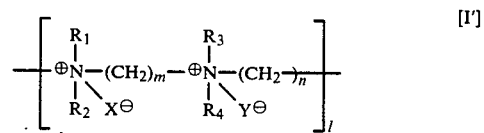

was added and stirred for 1 hour to flocculate latex particles. When the stirring was stopped, the flocculated latex particles readily sedimented. The flocculated latex was subjected to centrifugal filtration under the centrifugal force of 3200 G, whereby a putty-like wet cake having a solid content of 70% by weight (water content of 30% by weight) was obtained. The wet cake was granulated by extrusion and then dried with hot air of 120° C. by a fluidized drier, whereby a granular paste resin was obtained. 100 parts of the paste resin was mixed with 60 parts of a plasticizer whereby the paste resin was readily dispersed to give a good plastisol.

EXAMPLE 2

A mixture of 100 parts of a styrene monomer, 150 parts of water, 0.5 part of potassium persulfate (KPS) and 1.5 parts of sodium lauryl sulfate was polymerized at a temperature of 70° C. for 6 hours to obtain a polystyrene latex having an average particle size of 0.3μ. 0.8 part of 3,3-ionen (a viscosity of 0.12 dl/g in a 0.4N-KBr aqueous solution) of the general formula [I'] as given in Example 1 was added and stirred, whereby the emulsion system of the latex was destabilized to form a flowable suspension comprising substantially spherical coagulates having a size of from 20 to 50μ. When this suspension was left to stand still, no larger coagulates were formed and the supernatant liquid could easily be separated off. The centrifugal filtration was conducted in the same manner as in Example 1, whereby a wet cake was obtained. This wet cake could readily be dispersed again.

EXAMPLE 3

Into a 5 l reactor, 1000 g of a mixture comprising 70% by weight of α-methylstyrene monomer, 25% by weight of acrylonitrile and 5% by weight of styrene monomer was fed and 1500 ml of water and 50 g of sodium stearate were added for emulsification. Thereafter, 8 g of KPS was added thereto and the mixture was stirred at 60° C. for 10 hours, whereby a latex having an average particle size of 0.2μ was obtained.

To the latex, 10 g of 3,4-ionen (a viscosity of 0.15 dl/g in a 0.4N KBr aqueous solution) of the general formula [I'] and 500 ml of water were added and stirred. The latex particles in the latex were flocculated to form substantially spherical coagulates having a size of about 40μ and being suspended. No further growth of the coagulates was observed as time passed and the sedimented coagulates were readily separated from water. The centrifugal filtration was conducted in the same manner as in Example 1 whereby a wet cake was obtained. The wet cake could readily be redispersed.

EXAMPLE 4

1500 ml of water, 20 g of a mixture of sodium stearate and sodium oleate, 900 g of butadiene, 100 g of a sytrene monomer and 2 g of sodium persulfate were mixed and reacted at a temperature of 70° C. for 10 hours, whereby a SBR latex was obtained. Latex particles in the latex had an average particle size of 0.07μ.

To the latex, 20 g of 2,4-ionen (a viscosity of 0.12 dl/g in a 0.4N KBr aqueous solution) of the general formula [I'] was added to flocculate the latex. From the microscopic observation, it was found that the coagulates had a relatively homogeneous particles size and the average particle size was 20μ.

EXAMPLE 5

100 parts (as solid content) of a SBR (10% of styrene) latex having an average particle size of 0.2μ, 150 parts of a mixture composed of 70% by weight of a styrene monomer and 30% by weight of acrylonitrile, 0.6 part of terpinolene and 0.8 part of KPS were mixed and reacted under stirring at 60° C. for 50 hours, whereby a graft latex of ABS was obtained. To this latex, 2 parts of 6,6-ionen (a viscosity of 0.23 dl/g in a 0.4N KBr aqueous solution) of the general formula [I'] was added and stirred to flocculate the latex. A suspension of coagulates having an average particle size of 80μ was obtained and it was readily separated by vacuum filtration into the solid content and water.

COMPARATIVE EXAMPLE 1

To 100 ml of a polystyrene latex obtained in the same manner as in Example 2, 2 g of aluminum sulfate was added, whereby irregular coagulates were formed which showed no substantial flowability.

EXAMPLES 6 to 18

In a 300 l autoclave, 0.6 part of sodium lauryl sulfate, 0.03 part of potassium persulfate, 0.1 part of sodium hydrogen bicarbonate and 0.07 part of sodium sulfite were added to 100 parts of a vinyl chloride monomer, and emulsion polymerization was conducted at 60° C. until a saturated vaper pressure of the vinyl chloride monomer decreased by 2 kg/cm, whereby a vinyl chloride resin latex having an average particle size of 0.8 μm was obtained. This latex had a solid content of 38%.

To this latex, a predetermined amount, per 100 parts of the solid content of the latex, of a cationic polymer represented by the general formula:

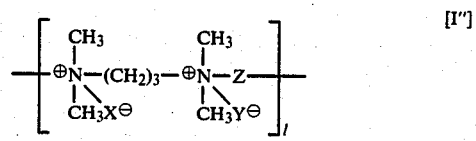

obtained by the polymerization of N,N,N',N'-tetramethylpropylenediamine with a Z component of various chemical species, was added in a form of a 0.1 wt.% aqueous solution and stirred for 1 hour for flocculation. When the stirring was stopped, the latex particles readily sedimented. The sedimented particles were centrifugally filtered (a centrifugal force of 3000 G) or vacuum filtered with filter paper to remove freed water, whereby a wet cake was obtained. The water content (% by weight) is shown in Table 1.

The molecular structure of the compound represented by the above general formula [I''] was identified by the NMR measurement (the polymer was purified, dried and then dissolved in heavy water) and the IR measurement (tabletted with KBr powder).

TABLE 1

| Ex. No. | Z | X and Y | Intrinsic viscosity | Amount (parts) | Separation method | water content (%) |
|---|---|---|---|---|---|---|
| 6 | $-(CH_2)_2-\overset{O}{\underset{\|}{C}}-(CH_2)_2-$ | Cl | 0.08 | 0.30 | Centrifugal separation | 42 |
| 7 | $-(CH_2)_2-O-(CH_2)_2-$ | Cl | 0.15 | 0.22 | Centrifugal separation | 36 |
| 8 | $-CH_2-\overset{O}{\underset{\|}{C}}-O-(CH_2)_2-$ | Br | 0.07 | 0.30 | Vacuum filtration | 39 |
| 9 | $-CH_2-\overset{OH}{\underset{\|}{CH}}-CH_2-$ | Cl | 0.23 | 0.23 | Vacuum filtration | 37 |
| 10 | $-CH_2-\overset{O}{\underset{\|}{C}}-O-(CH_2)_2-O-\overset{O}{\underset{\|}{C}}-CH_2-$ | Cl | 0.25 | 0.22 | Vacuum filtration | 38 |
| 11 | $-(CH_2)_2-\underset{CH_3}{\overset{CH_3}{\underset{\|}{\overset{\|}{Si}}}}-O-\underset{CH_3}{\overset{CH_3}{\underset{\|}{\overset{\|}{Si}}}}-(CH_2)_2-$ | Br | 0.06 | 0.42 | Vacuum filtration | 44 |
| 12 | $-CH_2-S-CH_2-$ | Cl | 0.12 | 0.20 | Centrifugal separation | 36 |
| 13 | $-CH_2-\overset{O}{\underset{\|}{S}}-CH_2-$ | Cl | 0.10 | 0.22 | Centrifugal separation | 34 |

TABLE 1-continued

| | Water-soluble cationic polymer | | | | Wet cake | |
|---|---|---|---|---|---|---|
| Ex. No. | Z | X and Y | Intrinsic viscosity | Amount (parts) | Separation method | water content (%) |
| 14 | —CH$_2$—S(=O)$_2$—CH$_2$— | Cl | 0.11 | 0.22 | Vacuum filtration | 40 |
| 15 | —(CH$_2$)$_2$—S—S—(CH$_2$)$_2$— | Br | 0.12 | 0.26 | Centrifugal separation | 42 |
| 16 | —CH$_2$—C$_6$H$_4$—CH$_2$— | Br | 0.28 | 0.22 | Centrifugal separation | 35 |
| 17 | —CH$_2$—(CF$_2$)$_2$—CH$_2$— | Br | 0.09 | 0.35 | Vacuum filtration | 40 |
| 18 | —(CH$_2$)$_2$—Si(CH$_3$)$_2$—NH—Si(CH$_3$)$_2$—(CH$_2$)$_2$— | Br | 0.14 | 0.23 | Vacuum filtration | 37 |

EXAMPLE 19

In a 5 l three-necked flask, 1 mol of each of

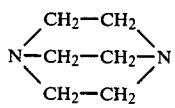

and dibromobutane was dropwise added in 2 hours at room temperature under nitrogen atmosphere to a 2 l of a solvent mixture of dimethylformamide (DMF)/water=4/1 and then 2 l of water was added. A mixture was left to stand for one week. The polymer thereby obtained was a compound having the structure represented by the general formula

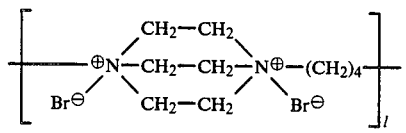

The aqueous solution thereby obtained was added to a vinyl chloride resin latex prepared in the same manner as in Example 6 in an amount of 1.03 l per 100 kg of the latex and the mixture was gently stirred at 40° C. Then, water was removed by means of a super decanter P660 manufactured by Tomoe Kogyo K.K. A wet cake having a water content of 37%, thereby obtained, was granulated by means of a horizontal extrusion type granulating machine (EXD-60, manufactured by Fuji Powdal Co., Ltd.) equipped with the screen having perforations of 1.1 mm $\phi$ whereby the water content of the wet adjusted to from 26 to 29%. The sample thereby obtained was dried with hot air of 50° C. for 1.5 hours by means of a fluidized drier, whereby a dried resin having a water content of not more than 0.1% was obtained.

The bulk density of the resin thereby obtained was 0.54 g/cm$^3$ which was substantially greater than the value of 0.25 g/cm$^3$±0.05 g/cm$^3$ of a usual paste resin.

To 100 parts of this resin, 60 parts of dioctylphthalate (DOP), 0.6 part of a non-ionic surfactant, 3 parts of a Ca-Zn thermal stabilizer and 3 parts of epoxidated soy bean oil were added to obtain a plastisol. The plastisol was subjected to a B-type viscosity measurement and an oven thermal stability test. The results thereby obtained are shown in Table 2. The oven thermal stability test was carried out with use of a film withdrawn after being kept in a hot air-circulating closed container of 195° C. for 10 minutes, and the test was continued at the same temperature until the film turned black.

On the other hand, lauryl alcohol was added to the wet cake having a water content of 37% in an amount of 0.8 part per 100 parts of the solid content of the wet cake to increase the viscosity. The wet cake was subjected to the double-shaft extrusion without adjusting the water content and then granulated by means of a granulating machine, whereby a resin having the same apparent density and thermal stability as in the above case was obtained.

EXAMPLE 20

In a 3 l autoclave, 1 g of ammonium persulfate was added in a nitrogen atmosphere to 377 g of diallyl dimethylammonium chloride and 705 g of dimethyl sulfoxide and the mixture was polymerized at 30° C. for 50 hours without stirring. The solid thereby obtained was added to 700 g of methanol and dissolved therein and then it was reprecipitated with a great amount of acetone. The intrinsic viscosity was measured in a 1N NaCl solution, the intrinsic viscosity was found to be 0.71. This compound is a compound having the general formula

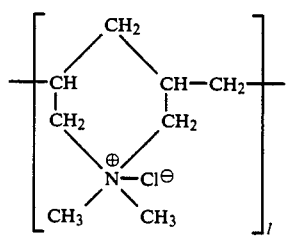

200 g of this methanol solution was added to 30 l of the latex as used in Example 19 and then water was removed by means of a superdecanter P660 manufactured by Tomoe Kogyo K.K., whereby the solid content of the waste liquid was at most 0.1% and the water content of the wet cake was 31%. The solid component separated from the water was dried at 50° C. by means of a multiplate drier, whereby a dried resin was obtained.

The dried resin was subjected to the same test as in Example 19.

COMPARATIVE EXAMPLE 2

To 100 ml of the PVC latex used in Example 19, 3 g of aluminum sulfate was added for flocculation. The entire system solidified, whereby the removal of water was impossible. The solidified mass was dried by means of a multiplate drier, whereby a dried resin was obtained.

COMPARATIVE EXAMPLE 3

To 1000 l of the PVC latex used in Example 19, 2 g of a usual cationic flocculant (a modified polyacrylamide type) was added for flocculation. The entire system turned creamy, whereby water was not freed and the removal of the water by filtration with filter paper was difficult.

REFERENCE EXAMPLE 1

The latex used in Example 19 was directly dried by means of a minispray drier manufactured by Yamato Kagaku K.K. The hot air had a temperature of 120° C. at the inlet and 50° C. at the outlet. This represents a conventional method whereby the latex was dried without any pretreatment. The heat energy required to obtain 1 kg of the dried PVC was 879 Kcal which is 2.8 to 3.6 times greater than the heat energy required in Examples 19 and 20.

It was, of course, impossible to remove water from the latex by centrifugal separation or filtration without pretreatment.

TABLE 2

| | Example 19 | Example 20 | Comparative Example 2 | Reference Example 1 |
|---|---|---|---|---|
| Viscosity: | | | | |
| 5 rpm | 4000 | 5200 | Incapable | 4600 |
| 10 rpm | 3700 | 4200 | of forming | 3700 |
| 50 rpm | 2800 | 3500 | a sol | 3300 |
| Gear Oven thermal stability test: | | | | |
| Colour after 10 minutes | Colourless | Colourless | Black | Colourless |
| Time for blackening | 90 min. | 60 min. | 10 min. | 40 min. |
| Heat energy required to obtain 1 kg of PVC (Kcal) | 316 | 242 | — | 879 |

In the following Examples, the physical data were obtained by the following methods.

(1) Yield stress

A metal strip ring having the total surface area of 1200 cm$^2$ was embedded in the wet cake for a depth of 1 cm. The ring was connected to a strain gauge. The ring was upwardly pulled at a rate of 5 mm/min whereby the maximum stress indicated on the strain gauge was recorded. The yield stress was calculated by dividing the maximum stress by the total surface area of the ring. The unit of the yield stress is dyne/cm$^2$.

(2) Granulation processability

The granulation extrusion was conducted for 1 minute at a screw rotational speed of 53 rpm by means of a horizontal extrusion type granulating machine (EXD-60, manufactured by Fuji Powdal K.K.) equipped with a screen having perforations of 0.8 mm$\phi$ and the amount of the granules thereby produced was multiplied by 60 to represent the granulation processability per hour. The unit is kg/hr.

(3) Granulation condition

When extruded from the granulation screen, the granules which did not adhere to one another were designated by the symbol "Good" and those which adhere to one another were designated by the symbol "Fail".

(4) Bulk density of the granules

Into an open-top measure of 10×10×10 cm$^3$, granules were dropped from the height of 30 cm above the measure until the measure was overflowed. Then, the overflowed granules were removed to make the top surface of the granules in the measure to be flush with the top of the measure. The unit is g/cm$^3$.

(5) The viscosity of the plastisol

The viscosity of the plastisol having the following composition was measured at 50 rpm by means of a B-type rotary viscosimeter (B 8H model, munufactured by Tokyo Keiki K.K.).

| | |
|---|---|
| Granular resin | 100 parts by weight |
| Di-2-ethylhexylphtalate (DOP) | 60 parts by weight |
| Ba—Zn stabilizer | 5 parts by weight |
| Expoxidated soy bean oil | 5 parts by weight |

The composition was stirred by Hobart mixer (planetary mixer)

(6) Scratch test

The degree of coarseness of the particles in the plastisol identified in item (5), was measured by Hegmann fineness gauge and rated in accordance with 8 classes classified by equally dividing the range of from 0 to 100$\mu$. The smaller the value, the finer the particles.

(7) Thermal stability test

The plastisol of item (5) was coated in the thickness of 0.2 mm and heated at 200° C. for 10 minutes in a Gear oven. The one which underwent no colour change was designated by the symbol "Good", and the one which underwent a colour change was designated by the symbol "Fail".

(8) Apparent viscosity of the redispersed suspension

A flowability-promoting agent is added to the wet cake and the flowability thereby imparted was measured by the B-type rotary viscosimeter. The viscosity at the apparent shear rate of 1.47 sec$^{-1}$ was taken as the apparent viscosity.

EXAMPLE 21

In a 300 l autoclave, 200 parts of water, 100 parts of vinyl chloride monomer, 0.6 part of sodium lauryl sulfate, 0.03 part of potassium persulfate, 0.1 part sodium hydrogen bicarbonate and 0.07 part of sodium sulfite were subjected to emulsion polymerization at a temperature of 60° C. until the saturated vapor pressure of the vinyl chloride monomer decreased by 2 kg/cm$^2$, whereby a polyvinyl chloride resin latex having an average particle size of 0.8 μm was obtained. The latex had a solid content of 38%.

0.18%, based on the solid content of the latex, the 3,4-ionen polymer ($[\eta]=0.28$) was added and gently stirred to flocculate the latex particles. The water was removed by centrifugal separation under centrifugal force of 3200 G by means of a centifugal filtration machine, whereby a wet cake having a water content of 35.2% was obtained. The yield stress of the wet cake was 2400 dyne/cm$^2$.

Then, 2-ethylhexanol was added to the wet cake in an amount of 0.5 part per 100 parts by weight of the solid content of the wet cake and kneaded for 30 minutes by a kneader, whereupon the yield stress increased to 9600 dyne/cm$^2$.

The wet cake with an increased viscosity had a granulation processability of 120 kg/hr and no adhesion of the granules to one another was observed. The granules was subjected to fluidized drying with hot air of 50° C. until the water content decreased to a level of at most 0.1%. The bulk density was 0.51 g/cm$^3$. Further, the disintegration during the fluidized drying was not more than 0.1%.

The dried granular vinyl chloride resin readily absorbed a plasticizer to form a plastisol. The plastisol had a viscosity of 2600 cp and was superior in its thermal stability and scratch test.

Further, during the preparation of the plastisol, no dust was formed and it was easy to measure the amount.

EXAMPLES 22 to 30

Each of the hydrophobic substances identified in Table 3 was added to the wet cake used in Example 21 and the granular dried resin was prepared in the same manner as in Example 21. The physical properties of the resin during and after its preparation are also shown in Table 3.

COMPARATIVE EXAMPLE 4

The latex of Example 21 was freeze-dried to remove the water. The vinyl chloride resin thereby obtained was very much likely to form a dust and its bulk density was as small as 0.17 g/cm$^3$. And the viscosity of the plastisol was 2700 cp which was substantially higher than the values of the Examples of the present invention.

COMPARATIVE EXAMPLE 5

The latex of Example 21 was spray-dried and then pulverized to obtain a vinyl chloride resin having an average particle size of 50 μm. The resin had a bulk density of as small as 0.25 g/cm$^3$ and was very much likely to form a dust in its handling. The viscosity of the plastisol was 2900 cp which was substantially higher than the values of the Examples of the present invention.

COMPARATIVE EXAMPLE 6

A polyethyleneoxide having a [B] value of 7.27 or 1,4-butanediol having a [B] value of 7.56 was added to the wet cake of Example 21 in an amount of 5 parts by weight or from 1 to 10 parts by weight, respectively, per 100 parts by weight of the solid content of the wet cake, whereby no viscosity increasing effect was obtainable and the granulation was unsatisfactory.

EXAMPLE 31 to 37

Emulsion polymerization was conducted in the same manner as Example 21 except that a fatty acid soup was used instead of the sodium lauryl sulfate and 0.05 part of sodium hydroxide was added. The average particle size of the latex particles was 0.76 μm (as measured by light transmission-centrifugal precipitation particle size distribution measuring apparatus).

An aqueous solution of 3,3-ionen polymer ($[\eta]=0.15$) was added to the latex obtained by the emulsion polymerization, in an amount of 0.22% based on the solid content of the latex and gently stirred in the same manner as in Example 21, whereby a wet cake having a water content of 31% and yield stress of 2800 dyne/cm$^2$ was obtained. A predetermined amount of a hydrophobic substance was added to the wet cake and then the wet cake was granulated and dried. The physical properties during the granulation and after the drying of the granulated products are also shown in Table 3.

TABLE 3

| Ex. No. | Hydrophobic substance Kinds | [B] | Amount | Yield stress upon flocculation | Granulation processability | Bulk density | Viscosity of plastisol | Notes |
|---|---|---|---|---|---|---|---|---|
| 21 | 2-ethylhexanol | 3.27 | 0.5 | 9600 | 120 | 0.51 | 2600 | In every Example |
| 22 | isooctane | 0 | 0.5 | 8900 | 100 | 0.51 | 2600 | Granulation |
| 23 | kerosine | 0 | 0.2 | 8000 | 100 | 0.50 | 2500 | condition and |
| 24 | kerosine | 0 | 0.8 | 9700 | 110 | 0.51 | 2550 | heat stability |
| 25 | lauryl alcohol | 1.83 | 0.5 | 8000 | 100 | 0.51 | 2600 | test: Good |
| 26 | stearyl alcohol/isopropyl alcohol = 1/1 | 2.57 | 0.5 | 7500 | 90 | 0.51 | 2600 | Scratch test: 4 |
| 27 | cetyl alcohol/propyl alcohol = 1/1 | 2.83 | 0.5 | 7400 | 90 | 0.51 | 2600 | |
| 28 | polybutene (MW630) | 0 | 0.5 | 8000 | 90 | 0.51 | 2650 | |
| 29 | polybutene (MW900) | 0 | 0.8 | 7500 | 100 | 0.51 | 2700 | |
| 30 | dibutyl ester | 5.57 | 1.0 | 6500 | 70 | 0.50 | 2800 | |
| 31 | 2-ethylhexanol | 3.27 | 0.5 | 9700 | 120 | 0.51 | 2450 | |
| 32 | isooctane | 0 | 0.5 | 9400 | 110 | 0.51 | 2500 | |
| 33 | kerosine | 0 | 0.5 | 9800 | 115 | 0.52 | 2400 | |
| 34 | lauryl alcohol | 1.83 | 0.5 | 9000 | 120 | 0.51 | 2250 | |

TABLE 3-continued

| Ex. No. | Hydrophobic substance Kinds | [B] | Amount | Yield stress upon flocculation | Granulation processability | Bulk density | Viscosity of plastisol | Notes |
|---|---|---|---|---|---|---|---|---|
| 35 | polybutene (MW630) | 0 | 0.5 | 9500 | 110 | 0.52 | 2500 | |
| 36 | butyl cellosolve | 5.59 | 1.0 | 5800 | 70 | 0.52 | — | |
| 37 | trioctylphosphite | 3.07 | 0.5 | 8200 | 100 | 0.51 | — | |

EXAMPLES 38 to 41

After the latex particles of Example 21 were flocculated, the conditions for water removal was varied to obtain wet cakes having different water contents. A predetermined amount of kerosine was added to each cake and the cake was granulated and dried. The physical properties of the particles during the granulation or after the granulation are shown in Table 4.

The physical data obtained by Examples 23 and 24 are also shown in Table 4.

EXAMPLES 42 to 44

Each of the water-soluble cationic polymers identified in Table 5 was added in a form of a 0.1 wt.% aqueous solution to the latex of Example 21 in a predetermined amount per 100 parts of the solid content of the latex, whereby a wet cake was obtained. The hydrophobic substance also identified in Table 5 was added to the wet cake in a predetermined amount per 100 parts of the solid content of the wet cake to increase the viscosity and then the wet cake was granulated.

TABLE 4

| Ex. No. | Wet cake Water content | Wet cake Yield stress | Amount of kerosine | Yield stress upon flocculation | Granulation processability | Bulk density | Viscosity of plastisol |
|---|---|---|---|---|---|---|---|
| 38 | 33.5 | 2900 | 0.1 | 10000 | 80 | 0.52 | 2600 |
| 23 | 35.2 | 2400 | 0.2 | 8000 | 100 | 0.50 | 2500 |
| 24 | 35.2 | 2400 | 0.8 | 9700 | 110 | 0.51 | 2550 |
| 39 | 36.8 | 2000 | 0.5 | 10300 | 120 | 0.50 | 2550 |
| 40 | 38.9 | 1600 | 1.0 | 8000 | 120 | 0.48 | 2500 |
| 41 | 41.2 | 1000 | 1.5 | 7100 | 70 | 0.46 | 2400 |

Further, the wet cakes obtained by Examples 10, 12, 13 and 16 were granulated in the same manner.

The bulk density was about 0.50 in each case and the viscosity of the plastisol was also low in each case.

TABLE 5

| Ex. No. | Water-soluble cationic polymer Structural formula | Amount | Water content of wet cake | Hydrophobic substance Chemical name | Hydrophobic substance Amount | Granules Bulk density | Granules Viscosity of sol(cp) |
|---|---|---|---|---|---|---|---|
| 42 | 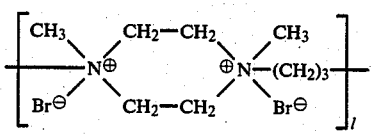 | 0.22 | 32 | lauryl alcohol | 0.8 | 0.56 | 2,200 |
| 43 | 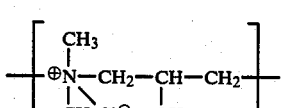 | 0.18 | 32 | kerosine | 1.0 | 0.55 | 1,800 |
| 44 | 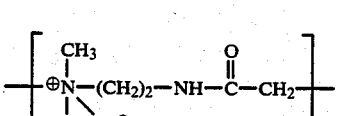 | 0.35 | 35 | lauryl alcohol | 0.8 | 0.44 | 2,900 |
| 10 | 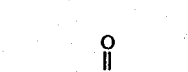 | 0.22 | 38 | kerosine | 0.5 | 0.42 | 2,500 |
| 12 | Z: —CH$_2$—S—CH$_2$— | 0.20 | 36 | kerosine | 1.0 | 0.52 | 3,500 |
| 34 | 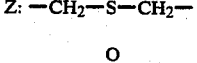 | 0.22 | 34 | kerosine | 1.0 | 0.53 | 2,100 |

TABLE 5-continued

| Ex. No. | Water-soluble cationic polymer | | Water content of wet cake | Hydrohobic substance | | Granules | |
|---|---|---|---|---|---|---|---|
| | Structural formula | Amount | | Chemical name | Amount | Bulk density | Viscosity of sol(cp) |
| 16 | Z: 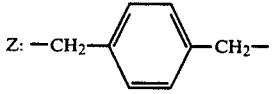 | 0.22 | 35 | lauryl alcohol | 0.8 | 0.51 | 2,500 |

EXAMPLES 45 to 49

Each of the flowability-promoting agents identified to Table 6 was added to the wet cake of Example 21 having a yield stress of 2400 dyne/cm² in a predetermined amount per 100 parts of the solid content of the wet cake and stirred, whereupon the flocculated condition was broken and a thick latex was formed where the particles were re-dispersed. This thick latex was spray-dried by means of Anhydro Laboratory Spray Dryers with the rotary disc rotated at a speed of 5000 rpm. The viscosity of the thick latex, the viscosity of the plastisol, the results of the scratch test and thermal stability, the bulk density and the average particle size of the powder are shown also in Table 6.

TABLE 6

| Ex. No. | Flowability-promoting agent | | Viscosity of latex (cp) | Viscosity of plastisol (cp) | Bulk density (g/cm³) | Average particle size (μm) | Notes |
|---|---|---|---|---|---|---|---|
| | Chemical name | Amount | | | | | |
| 45 | Polyoxyethylenenonylphenyl ether (10 units of ethyleneoxide) | 0.8 | 75 | 2150 | 0.56 | 95 | Scratch test: 4 in every Example |
| 46 | Polyoxyethylenelauryl ether (12 units of ethyleneoxide) | 0.5 | 100 | 1940 | 0.58 | 95 | Thermal stability test: Good except for Example 47 |
| 47 | Sodium polyoxyethylenelauryl ether sulfonate (6 units of ethyleneoxide) | 0.6 | 85 | 2100 | 0.58 | 95 | |
| 48 | Cetylethyldimethylammonium bromide | 0.6 | 900 | 1950 | 0.67 | 150 | |
| 49 | Sodium polyoxyethylenenonylphenyl ether sulfate (10 units of ethyleneoxide) | 1.0 | 150 | 1940 | 0.61 | 105 | |

I claim:

1. A process for producing a thermoplastic resin which comprises flocculating latex particles in a latex material by adding a water-soluble cationic polymer containing a quaternary ammonium salt in its molecular chain to the latex, removing freed water from the flocculated latex to obtain a wet cake and then drying the wet cake wherein a flowability-promoting agent is added to the wet cake, followed by spray drying.

2. The process of claim 1, wherein the flowability promoting agent is a surfactant having a polyoxyethylene chain in its molecular chain.

3. A process for producing a thermoplastic resin which comprises flocculating latex particles in a latex material by adding a water-soluble cationic polymer containing a quarternary ammonium salt in its molecular chain to the latex, removing freed water from the flocculated latex to obtain a wet cake and then drying the wet cake directly or after granulation, wherein a hydrophobic substance having a value [B] of at most 7 is mixed to the wet cake, where [B] is represented by the equation $$[B] = \frac{[H]}{[H] + [L]} \times \frac{100}{5}$$

wherein [H] and [L] represent the weight of hydrophilic groups and the weight of hydrophobic groups in the structure of the hydrophobic substance.

4. The process according to claim 3 wherein the hydrophobic substance is added in an amount of from 0.01 to 10 parts by weight per 100 parts by weight of the solid content in the wet cake.

5. The process according to claim 3 wherein the yield stress of the wet cake after mixing with the hydrophobic substance and prior to the granulation is from 3000 to 100,000 dyne/cm², preferably from 4000 to 10,000 dyne/cm².

6. The process according to claim 1 wherein the flowability-promoting agent is added in an amount of from 0.1 to 2 parts by weight per 100 parts by weight of solid content in the wet cake.

7. The process according to claim 1 wherein the wet cake after the addition of the flowability-promoting agent and prior to the spray drying has an apparent viscosity of at most 20,000 centipoise, preferably at most 10,000 centipoise within a range of the apparent shear rate of from 1 to 5 sec⁻¹.

* * * * *